(12) United States Patent
Pick et al.

(10) Patent No.: US 11,588,597 B2
(45) Date of Patent: Feb. 21, 2023

(54) DETERMINING A DENSITY OF A PHASE TRACKING REFERENCE SIGNAL

(71) Applicant: QUALCOMM Incorporated, San Diego, CA (US)

(72) Inventors: Jacob Pick, Beit Zait (IL); Shay Landis, Hod Hasharon (IL); Amit Bar-Or Tillinger, Tel-Aviv (IL); Yehonatan Dallal, Kfar Saba (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/093,425

(22) Filed: Nov. 9, 2020

(65) Prior Publication Data

US 2022/0150010 A1    May 12, 2022

(51) Int. Cl.
| | | |
|---|---|---|
| *H04L 5/00* | (2006.01) | |
| *H04L 1/00* | (2006.01) | |
| *H04W 56/00* | (2009.01) | |
| *H04W 72/04* | (2023.01) | |

(52) U.S. Cl.
CPC .......... *H04L 5/0048* (2013.01); *H04L 1/0003* (2013.01); *H04W 56/0035* (2013.01); *H04W 72/042* (2013.01)

(58) Field of Classification Search
CPC ............... H04L 5/0048; H04L 1/0003; H04W 56/0035; H04W 72/042; H04B 7/0632
See application file for complete search history.

(56) References Cited

U.S. PATENT DOCUMENTS

| | | | | |
|---|---|---|---|---|
| 2018/0091765 | A1* | 3/2018 | Mobasher | H04L 1/0041 |
| 2018/0205528 | A1* | 7/2018 | Bai | H04L 27/2688 |
| 2018/0367277 | A1* | 12/2018 | Zhang | H04W 72/04 |
| 2019/0166597 | A1* | 5/2019 | Xiong | H04L 1/1861 |
| 2019/0260466 | A1* | 8/2019 | Bai | H04B 7/2603 |
| 2019/0305908 | A1* | 10/2019 | Lee | H04L 5/0035 |
| 2019/0356463 | A1* | 11/2019 | Zhang | H04W 80/08 |
| 2019/0394758 | A1* | 12/2019 | Cheng | H04L 5/0057 |

(Continued)

FOREIGN PATENT DOCUMENTS

| | | |
|---|---|---|
| WO | WO-2018132237 A2 | 7/2018 |
| WO | WO-2019098938 A1 | 5/2019 |

OTHER PUBLICATIONS

CMCC: "Discussion on PT-RS Design", 3GPP TSG RAN WG1 Ad-Hoc#2, 3GPP Draft, R1-1710777, vol. RAN WG1, No. Qingdao, P.R. China, Jun. 27, 2017-Jun. 30, 2017, pp. 1-9, Jun. 26, 2017 (Jun. 26, 2017), XP051299981, Retrieved from the Internet: URL: http://www.3gpp.org/ftp/Meetings_3GPP_SYNC/RAN1/Docs/ [retrieved on Jun. 26, 2017] Sections 1-5.

(Continued)

*Primary Examiner* — Shah M Rahman
(74) *Attorney, Agent, or Firm* — Arun Swain; Harrity & Harrity, LLP

(57) ABSTRACT

Various aspects of the present disclosure generally relate to wireless communication. In some aspects, a user equipment (UE) may transmit, to a base station, a report that indicates a phase tracking reference signal (PTRS) density for a PTRS. The UE may receive, from the base station via a downlink shared channel, the PTRS in accordance with the PTRS density based at least in part on the report. Numerous other aspects are described.

30 Claims, 9 Drawing Sheets

(56) References Cited

U.S. PATENT DOCUMENTS

| | | | | |
|---|---|---|---|---|
| 2020/0008270 A1* | 1/2020 | Zhang | .................. | H04L 1/0004 |
| 2020/0052861 A1* | 2/2020 | Li | ......................... | H04L 1/0026 |
| 2020/0076557 A1* | 3/2020 | Sun | ....................... | H04L 5/0048 |
| 2020/0154410 A1* | 5/2020 | Suzuki | ....................... | H04L 1/16 |
| 2020/0314817 A1* | 10/2020 | Sun | ....................... | H04L 5/0094 |
| 2020/0389270 A1* | 12/2020 | Lee | ....................... | H04L 5/0048 |
| 2020/0395988 A1* | 12/2020 | Lee | ...................... | H04B 7/0626 |
| 2021/0021317 A1* | 1/2021 | Nammi | ............. | H04W 72/1273 |
| 2021/0044372 A1* | 2/2021 | Yang | .................. | H04L 27/2636 |
| 2021/0044402 A1* | 2/2021 | Gao | ....................... | H04L 5/0048 |
| 2021/0091902 A1* | 3/2021 | Yamada | ................ | H04L 5/0048 |
| 2021/0099265 A1* | 4/2021 | Shin | .................. | H04W 72/0453 |
| 2021/0203438 A1* | 7/2021 | Matsumura | ............. | H04L 1/189 |
| 2021/0367734 A1* | 11/2021 | Qi | ......................... | H04L 5/0048 |

OTHER PUBLICATIONS

International Search Report and Written Opinion—PCT/US2021/071798—ISA/EPO—dated Feb. 2, 2022.

* cited by examiner

DETERMINING A DENSITY OF A PHASE TRACKING REFERENCE SIGNAL

FIELD OF THE DISCLOSURE

Aspects of the present disclosure generally relate to wireless communication and to techniques and apparatuses for determining a density of a phase tracking reference signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station, a report that indicates a phase tracking reference signal (PTRS) density for a PTRS; and receiving, from the base station via a downlink shared channel, the PTRS in accordance with the PTRS density based at least in part on the report.

In some aspects, a method of wireless communication performed by a base station includes receiving, from a UE, a report that indicates a PTRS density for a PTRS; and transmitting, to the UE via a downlink shared channel, the PTRS in accordance with the PTRS density based at least in part on the report.

In some aspects, a UE for wireless communication includes a memory and one or more processors operatively coupled to the memory, the memory and the one or more processors configured to: transmit, to a base station, a report that indicates a PTRS density for a PTRS; and receive, from the base station via a downlink shared channel, the PTRS in accordance with the PTRS density based at least in part on the report.

In some aspects, a base station for wireless communication includes a memory and one or more processors operatively coupled to the memory, the memory and the one or more processors configured to: receive, from a UE, a report that indicates a PTRS density for a PTRS; and transmit, to the UE via a downlink shared channel, the PTRS in accordance with the PTRS density based at least in part on the report.

In some aspects, a non-transitory computer-readable medium storing a set of instructions for wireless communication includes one or more instructions that, when executed by one or more processors of a UE, cause the UE to: transmit, to a base station, a report that indicates a PTRS density for a PTRS; and receive, from the base station via a downlink shared channel, the PTRS in accordance with the PTRS density based at least in part on the report.

In some aspects, a non-transitory computer-readable medium storing a set of instructions for wireless communication includes one or more instructions that, when executed by one or more processors of a base station, cause the base station to: receive, from a UE, a report that indicates a PTRS density for a PTRS; and transmit, to the UE via a downlink shared channel, the PTRS in accordance with the PTRS density based at least in part on the report.

In some aspects, an apparatus for wireless communication includes means for transmitting, to a base station, a report that indicates a PTRS density for a PTRS; and means for receiving, from the base station via a downlink shared channel, the PTRS in accordance with the PTRS density based at least in part on the report.

In some aspects, an apparatus for wireless communication includes means for receiving, from a UE, a report that indicates a PTRS density for a PTRS; and means for transmitting, to the UE via a downlink shared channel, the PTRS in accordance with the PTRS density based at least in part on the report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
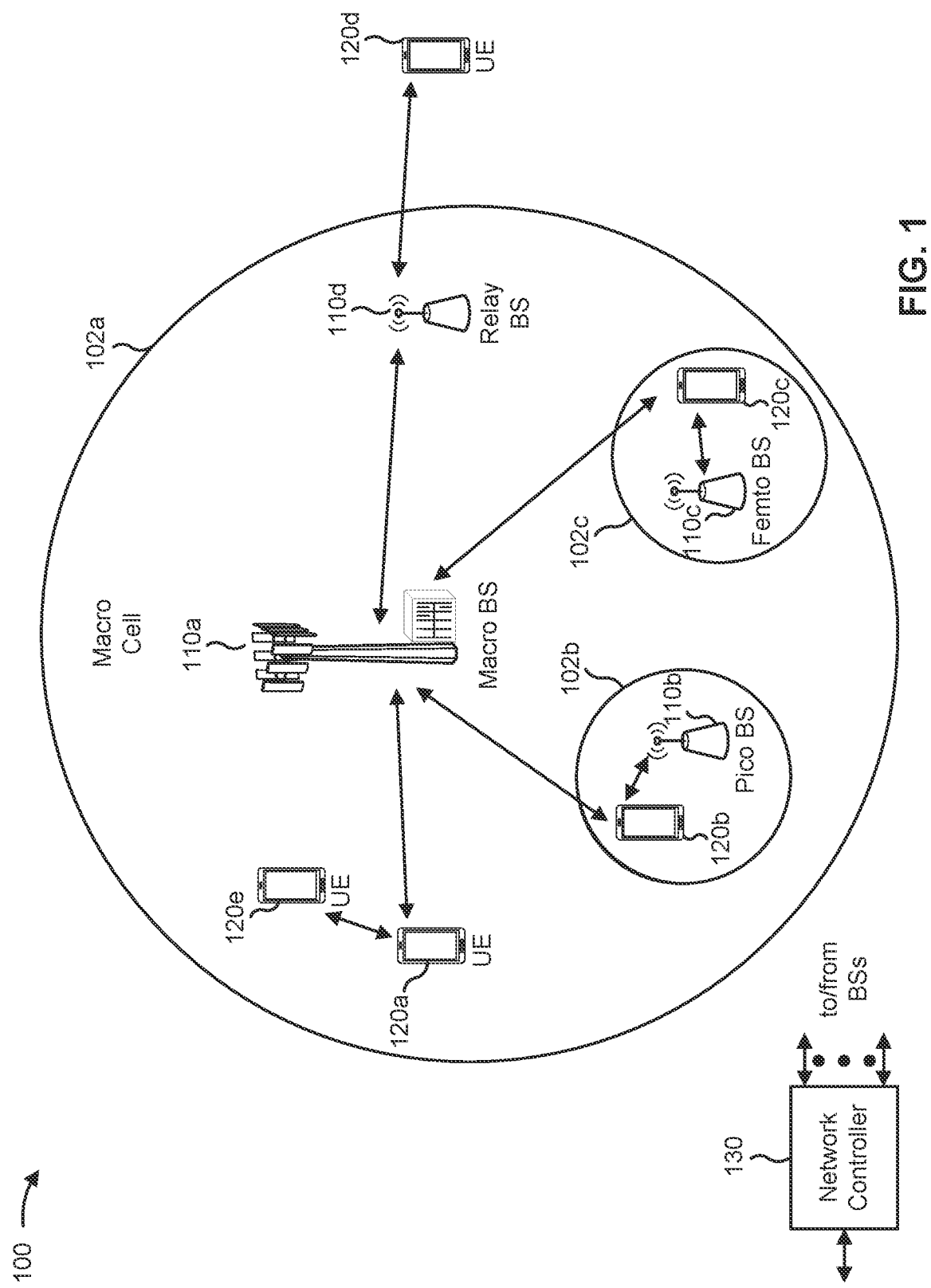
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
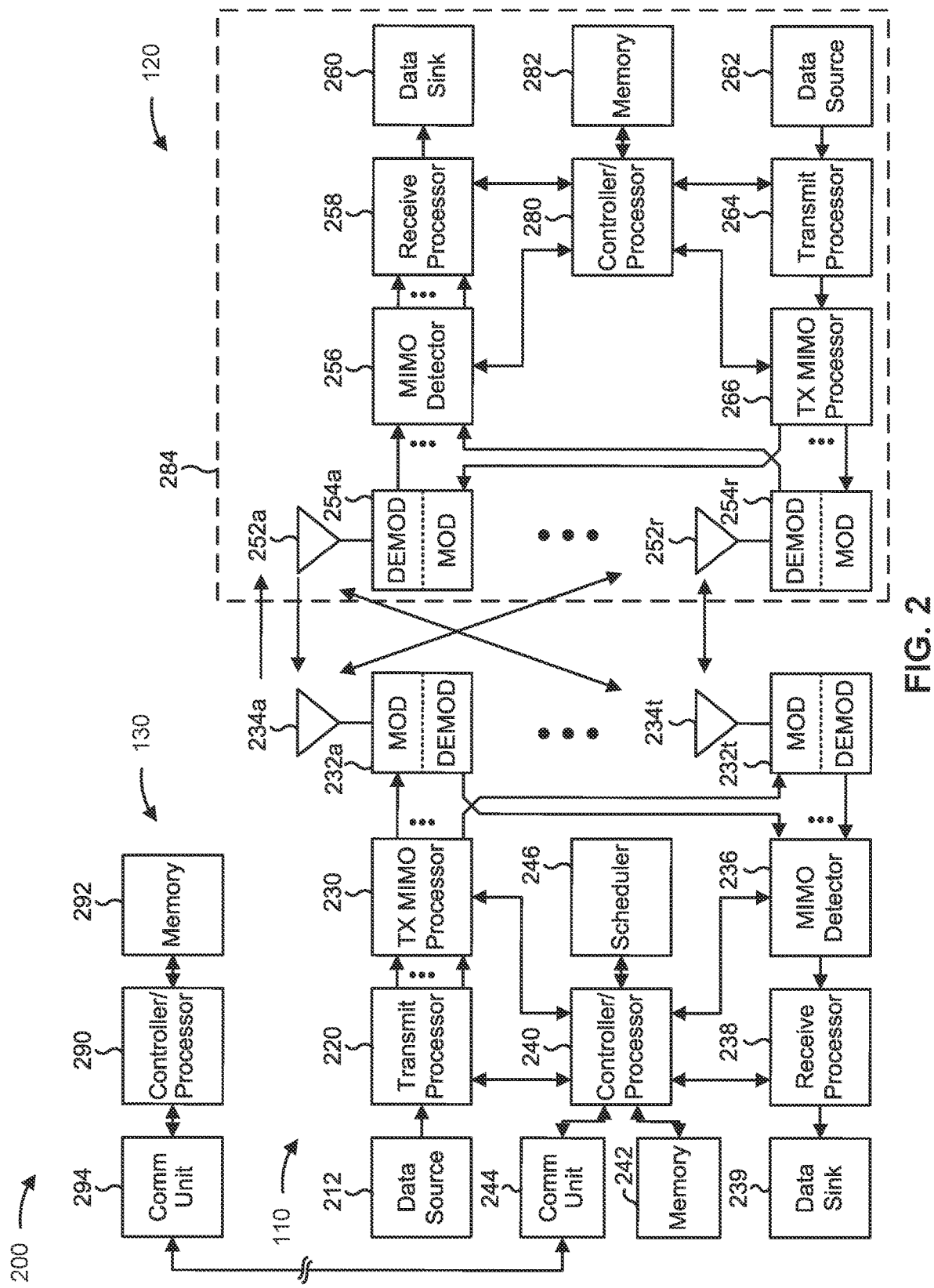
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with determining a density of a phase tracking reference signal (PTRS), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, a UE (e.g., UE 120) may include means for transmitting, to a base station, a report that indicates a PTRS density for a PTRS, means for receiving, from the base station via a downlink shared channel, the PTRS in accordance with the PTRS density based at least in part on the report, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a base station (e.g., base station 110) may include means for receiving, from UE, a report that indicates a PTRS density for a PTRS, means for transmitting, to the UE via a downlink shared channel, the PTRS in accordance with the PTRS density based at least in part on the report, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

"PTRS density" may refer to a number of PTRS signals within a defined time period. While an increased PTRS density may improve a phase noise estimation, the increased PTRS density may result in a degraded throughput. A reduced PTRS density may result in an improved throughput, but a quality of the phase noise estimation may be degraded. In certain cases, adjusting the PTRS density based at least in part on certain factors may be beneficial.

In various aspects of techniques and apparatuses described herein, a UE may determine a modulation and coding scheme (MCS), a signal-to-noise ratio (SNR), and/or a measured phase noise level associated with the UE. In some aspects, the UE may determine the MCS based at least in part on downlink information received from a base station via a PDCCH. In other words, the UE may detect the MCS based at least in part on the downlink information received via the PDCCH. In some aspects, the UE may determine the SNR based at least in part on a channel state information (CSI) report transmitted to the base station. The CSI report may include CSI associated with the UE, which may be used by the UE to determine the SNR. In some aspects, the UE may determine the measured phase noise level based at least in part on a first PTRS (or an initial PTRS) received from the base station. The measured phase noise level may be associated with the first PTRS received at the UE from the base station.

In various aspects of techniques and apparatuses described herein, the UE may determine a PTRS density based at least in part on the MCS, the SNR, and/or the measured phase noise level. In some aspects, the PTRS density may be associated with a time domain. In some aspects, the PTRS density may be indicated with a number of symbols equal to 5, 10, 20, 30, 40, 50, or 100 symbols (e.g., a PTRS signal may be transmitted every 5 symbols, every 10 symbols, and so on). In some aspects, the UE may transmit a report that includes the PTRS density or an indication of the PTRS density to the base station, where the PTRS density may be based at least in part on the MCS, the SNR, and/or the measured phase noise level. In some aspects, the base station may receive the report or the indication, and the base station may transmit a second PTRS to the UE in accordance with the PTRS density. In some aspects, the UE may receive the second PTRS with the associated PTRS density, and the UE may estimate a phase noise based at least in part on the second PTRS with the associated PTRS density. The UE may estimate the phase noise associated with the second PTRS.

In some aspects, the PTRS density based at least in part on the MCS, the SNR, and/or the measured phase noise level may result in an improved phase noise tracking, as the PTRS density may be adjusted (e.g., increased or decreased) depending on the MCS, the SNR, and/or the measured phase noise level. The PTRS density based at least in part on the MCS, the SNR, and/or the measured phase noise level may result in an improved spectral efficiency, as the PTRS density may be adjusted depending on channel conditions. In other words, the PTRS density may be optimized to the channel conditions. The PTRS density based at least in part on the MCS, the SNR, and/or the measured phase noise level may result in an increased peak rate, as the PTRS density may be adjusted depending on the MCS, the SNR, and the measured phase noise level.

Figure 3:
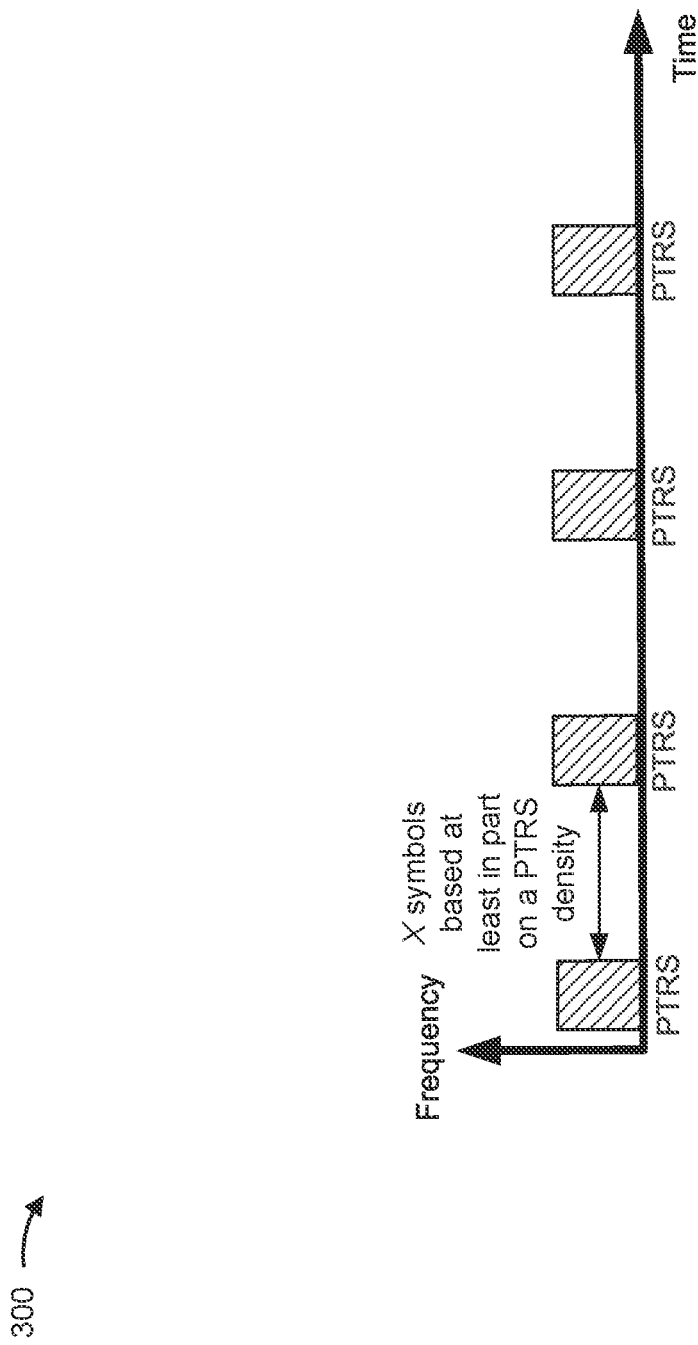
FIG. 3 is a diagram illustrating an example of phase tracking reference signals (PTRSs) in accordance with a PTRS density, in accordance with various aspects of the present disclosure.

FIG. 3 is a diagram illustrating an example 300 of PTRSs in accordance with a PTRS density, in accordance with various aspects of the present disclosure.

In some aspects, the PTRSs may be used by a UE (e.g., UE 120) and/or a base station (e.g., base station 110) for phase tracking, for phase estimation, and/or to correct oscillator phase noise, especially for millimeter wave communications. A PTRS may be embedded in a physical downlink shared channel (PDSCH) resource allocation or a physical uplink shared channel (PUSCH) allocation. In some cases, one PTRS port may be configured for downlink communication (e.g., within a PDSCH resource allocation), and up to two PTRS ports may be configured for uplink communication (e.g., within a PUSCH resource allocation).

In some aspects, the PTRS density based at least in part on the MCS, the SNR, and/or the measured phase noise level. In some aspects, the PTRS density may be associated with a time domain. In some aspects, the PTRS density may be associated with a number of symbols, where the number may be equal to 5, 10, 20, 30, 40, 50, or 100 symbols (e.g., a PTRS may be transmitted every 5 symbols, every 10 symbols, and so on).

In some aspects, higher SNR in the PTRSs may provide a more accurate phase error estimation. Accordingly, in some aspects, the PTRSs may be located in the tones with good channel conditions, high SNR, and/or high signal-to-interference-plus-noise ratio (SINR), which may result in more accurate phase tracking at the UE. Increasing the number of PTRSs may provide more accurate phase error estimation. For example, an increased number of PTRSs may allow for thermal noise to be averaged out over the larger number of PTRSs. However, using a large number of PTRSs may increase overhead.

As indicated above, FIG. 3 is provided as an example. Other examples may differ from what is described with regard to FIG. 3.

Figure 4:
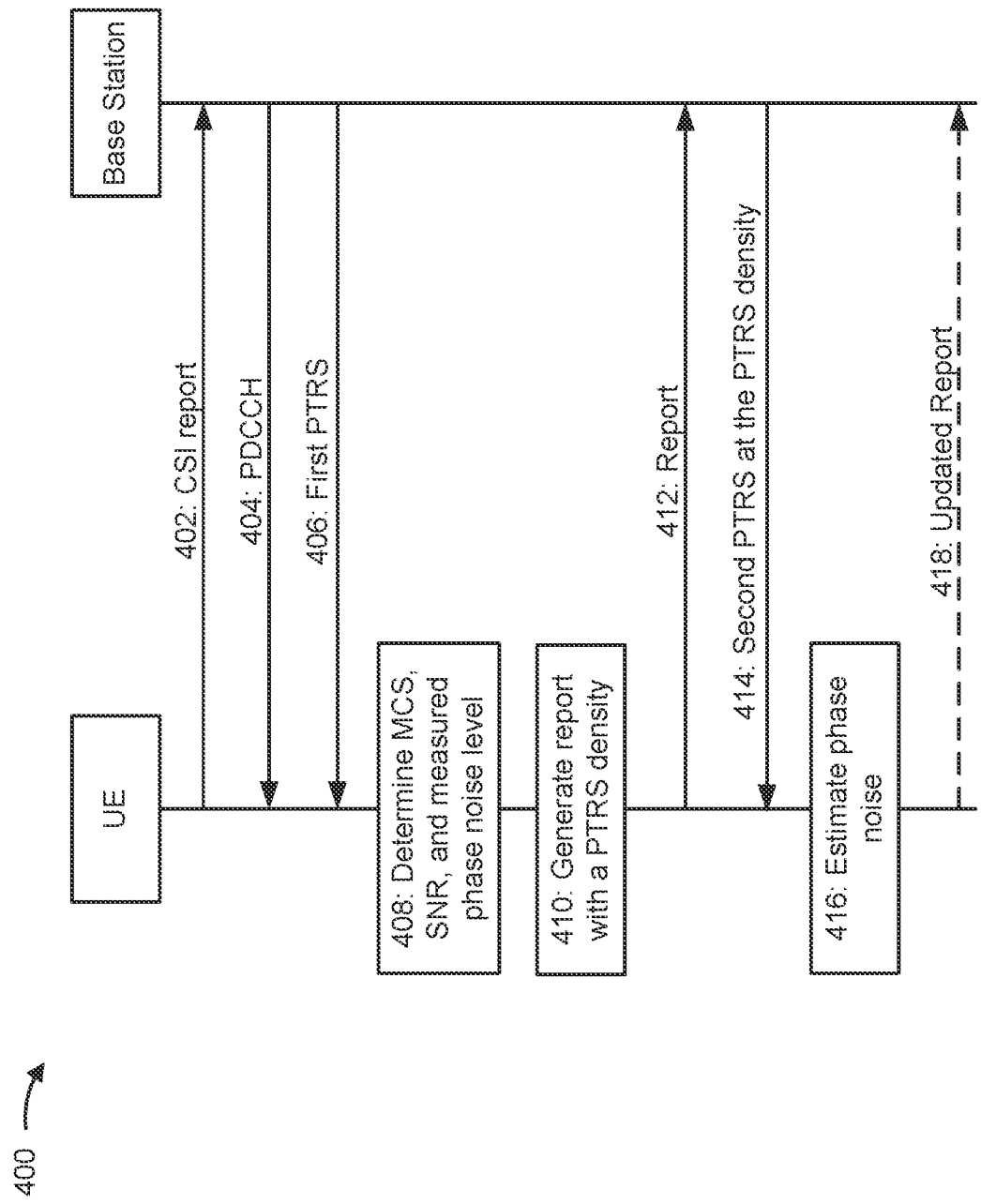
FIG. 4 is a diagram illustrating an example associated with determining a PTRS density, in accordance with various aspects of the present disclosure.

FIG. 4 is a diagram illustrating an example 400 associated with determining a PTRS density, in accordance with various aspects of the present disclosure. As shown in FIG. 4, example 400 includes communication between a UE (e.g., UE 120) and a base station (e.g., base station 110). In some aspects, the UE and the base station may be included in a wireless network such as wireless network 100. The UE and the base station may communicate on a wireless sidelink.

As shown by reference number 402, the UE may generate a CSI report and transmit the CSI report to the base station. The UE may generate the CSI report based at least in part on a channel state information reference signal (CSI-RS) received from the base station. The CSI report may include CSI associated with the UE. The CSI report may include a channel quality indicator (CQI), a precoding matrix indicator (PMI), a CSI-RS resource indicator (CRI), a strongest layer indicator (SLI), and/or a rank indicator (RI). The CSI report transmitted by the UE may be periodic, semi-persistent, or aperiodic.

As shown by reference number 404, the base station may transmit downlink information to the UE via a physical downlink control channel (PDCCH). In some aspects, the base station may transmit the downlink information to the UE via the PDCCH based at least in part on an MCS associated with the UE. For example, the base station may select the MCS for the UE based at least in part on radio condition(s) between the base station and the UE, and the base station may transmit the downlink information to the UE in accordance with the MCS. The MCS may correspond to an MCS index, which may range from 0 to 31. The UE may receive the downlink information from the base station via the PDCCH.

As shown by reference number 406, the base station may transmit a first PTRS (or an initial PTRS) to the UE. The first PTRS may be associated with a phase noise estimation at the UE.

As shown by reference number 408, the UE may determine the MCS associated with the UE, the SNR associated with the UE, and/or a measured phase noise level associated with the UE.

In some aspects, the UE may determine the MCS associated with the UE. The UE may determine the MCS based at least in part on the downlink information received from the base station via the PDCCH. In other words, the UE may detect the MCS selected by the base station for the UE based at least in part on the downlink information received from the base station, as the MCS may be associated with the downlink information that is decoded at the UE.

In some aspects, the UE may determine the SNR associated with the UE. The SNR may be a numerical value expressed in decibels (dB). In some aspects, the UE may determine or estimate the SNR based at least in part on the CSI associated with the UE.

In some aspects, the UE may determine the measured phase noise level associated with the UE. The UE may determine the measured phase noise level based at least in part on the first PTRS (or initial PTRS) received from the base station. In other words, the UE may estimate or measure a phase noise associated with the first PTRS.

As shown by reference number 410, the UE may generate a report that indicates a PTRS density. The PTRS density may be based at least in part on the MCS, the SNR, and/or the measured phase noise level. In other words, the UE may use the MCS, the SNR, and/or the measured phase noise level to determine the PTRS density for inclusion in the report. The UE may set the PTRS density based at least in part on the MCS, the SNR, and/or the measured phase noise level. In some aspects, the UE may access a predefined table, which the base station may use to determine a PTRS density corresponding to a given MCS, a given SNR (or a given SNR range), and/or a given measured phase noise level (or a given measured phase noise level range). The PTRS density may be associated with a time domain.

In some aspects, the PTRS density may be associated with a number of symbols, where the number of symbols may be equal to 0, 5, 10, 20, 30, 40, 50, or 100 symbols. For example, depending on the PTRS density, a PTRS may be transmitted every 5 symbols, every 10 symbols, and so on. In this example, the number of symbols may be equal to zero, which may indicate that no PTRS is to be subsequently transmitted by the base station to the UE.

In some aspects, the report generated by the UE may indicate the PTRS density with a granularity equal to 0, 5, 10, 20, 30, 40, 50, or 100 symbols. The report may use a defined number of bits, depending on a number of possible symbol periodicity values. In this example, the report may use three bits to convey eight possible values associated with the PTRS density.

In some aspects, the UE may receive, from the base station, an instruction to use an increased MCS. The UE may receive, from the base station, the PTRS with an increased PTRS density based at least in part on the increased MCS. The increased PTRS density may be associated with the increased MCS. In other words, for a high MCS, a relatively dense PTRS (e.g., a higher PTRS density) may be selected by the base station.

In some aspects, the UE may receive, from the base station, an instruction to use a reduced MCS. The UE may receive, from the base station, the PTRS with a reduced PTRS density based at least in part on the reduced MCS. The reduced PTRS density may be associated with the reduced MCS. In other words, for a low MCS, fewer PTRS (e.g., a lower PTRS density) may be selected by the base station.

In some aspects, an increased PTRS density may be used for an increased MCS. A PTRS density may be increased when an MCS increases because an increased MCS is associated with an increased noise and therefore a reduced SNR. The increased PTRS density may enable the UE to achieve an increased SNR.

As shown by reference number 412, the UE may transmit the report that indicates the PTRS density to the base station, where the PTRS density may be based at least in part on the MCS, the SNR, and/or the measured phase noise level.

As shown by reference number 414, the base station may transmit a second PTRS in accordance with the PTRS density, where the PTRS density associated with the second PTRS may be based at least in part on the MCS, the SNR, and/or the measured phase noise level. As an example, depending on the PTRS density, the base station may transmit the second PTRS every 5 symbols, every 10 symbols, and so on. In some aspects, since the UE may determine the PTRS density and transmit an indication of the PTRS density to the base station, the UE may be able to receive and successfully decode the PTRS having the PTRS density.

As shown by reference number 416, the UE may estimate a phase noise based at least in part on the PTRS received in accordance with the PTRS density. As an example, the UE may estimate the phase noise based at least in part on a relatively dense PTRS, when the PTRS density is selected based at least in part on the MCS, the SNR, and/or the measured phase noise level. As another example, the UE may estimate the phase noise based at least in part on a relatively sparse PTRS, when the PTRS density is selected based at least in part on the MCS, the SNR, and/or the measured phase noise level.

As shown by reference number 418, the UE may transmit an updated report that indicates an updated PTRS density for a subsequent PTRS (e.g., a third PTRS). For example, the UE may determine an updated MCS associated with the UE, an updated SNR associated with the UE, and/or an updated measured phase noise level associated with the UE (e.g., a measured phase noise level associated with the second PTRS). The UE may determine the updated PTRS density based at least in part on the updated MCS, the updated SNR, and/or the updated measured phase noise level. The UE may determine the updated PTRS density for inclusion in the updated report transmitted to the base station. The base station may transmit the subsequent PTRS in accordance with the updated PTRS density.

As indicated above, FIG. 4 is provided as an example. Other examples may differ from what is described with regard to FIG. 4.

Figure 5:
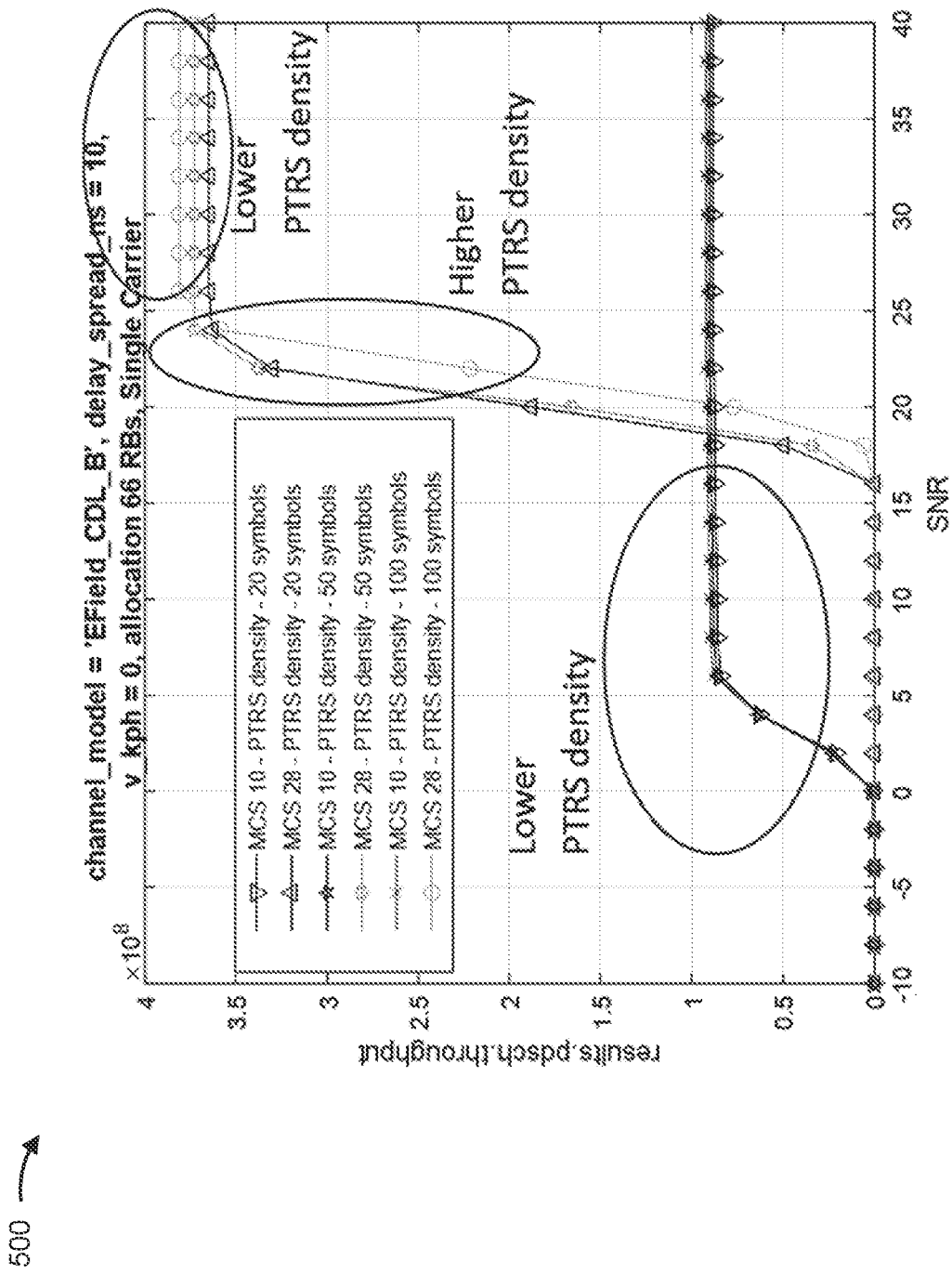
FIG. 5 is a diagram illustrating an example associated with a PTRS density in relation to a modulation and coding scheme, in accordance with various aspects of the present disclosure.

FIG. 5 is a diagram illustrating an example 500 associated with a PTRS density in relation to an MCS, in accordance with various aspects of the present disclosure.

As shown in FIG. 5, in this example, an MCS index of 10 may correspond to a PTRS density of 20 symbols for a given SNR range, an MCS index of 28 may correspond to a PTRS density of 20 symbols for a given SNR range, an MCS index of 10 may correspond to a PTRS density of 50 symbols for a given SNR range, an MCS index of 28 may correspond to a PTRS density of 50 symbols for a given SNR range, an MCS index of 10 may correspond to a PTRS density of 100 symbols for a given SNR range, and an MCS index of 28 may correspond to a PTRS density of 100 symbols for a given SNR range. In this example, an MCS index and a corresponding PTRS may be mapped to a PDSCH throughput in relation to an SNR.

As shown in FIG. 5, for the MCS index of 10, regardless of whether a PTRS density of 20, 50, or 100 symbols is used, a corresponding PDSCH throughput may be relatively constant for a given SNR range. As a result, fewer PTRS density or a lower PTRS density (e.g., a PTRS density of 100 symbols) may be selected for the MCS index of 10 for the given SNR range. Since the lower PTRS density may correspond to fewer symbols being used to transmit the PTRS, an increased number of symbols may be available for data throughput.

As further shown in FIG. 5, for the MCS index of 28, regardless of whether the PTRS density of 20, 50, or 100 symbols is used, a corresponding PDSCH throughput may be relatively constant for a given SNR range (e.g., an SNR range between 25 and 40). As a result, a relatively sparse PTRS density or a lower PTRS density (e.g., a PTRS density of 100 symbols) may be selected for the MCS index of 10 for the given SNR range.

As further shown in FIG. 5, for the MCS index of 28 and the PTRS density of 20, 50, or 100 symbols, a corresponding PDSCH throughput may not be constant for a given SNR range (e.g., an SNR range between 20 and 25). As a result, a relatively dense PTRS density or a higher PTRS density (e.g., a PTRS density of 20 symbols or 50 symbols) may be selected for the MCS index of 28 for the given SNR range. The higher PTRS density may result in an increased number of symbols being used to transmit the PTRS.

As indicated above, FIG. 5 is provided as an example. Other examples may differ from what is described with regard to FIG. 5.

Figure 6:
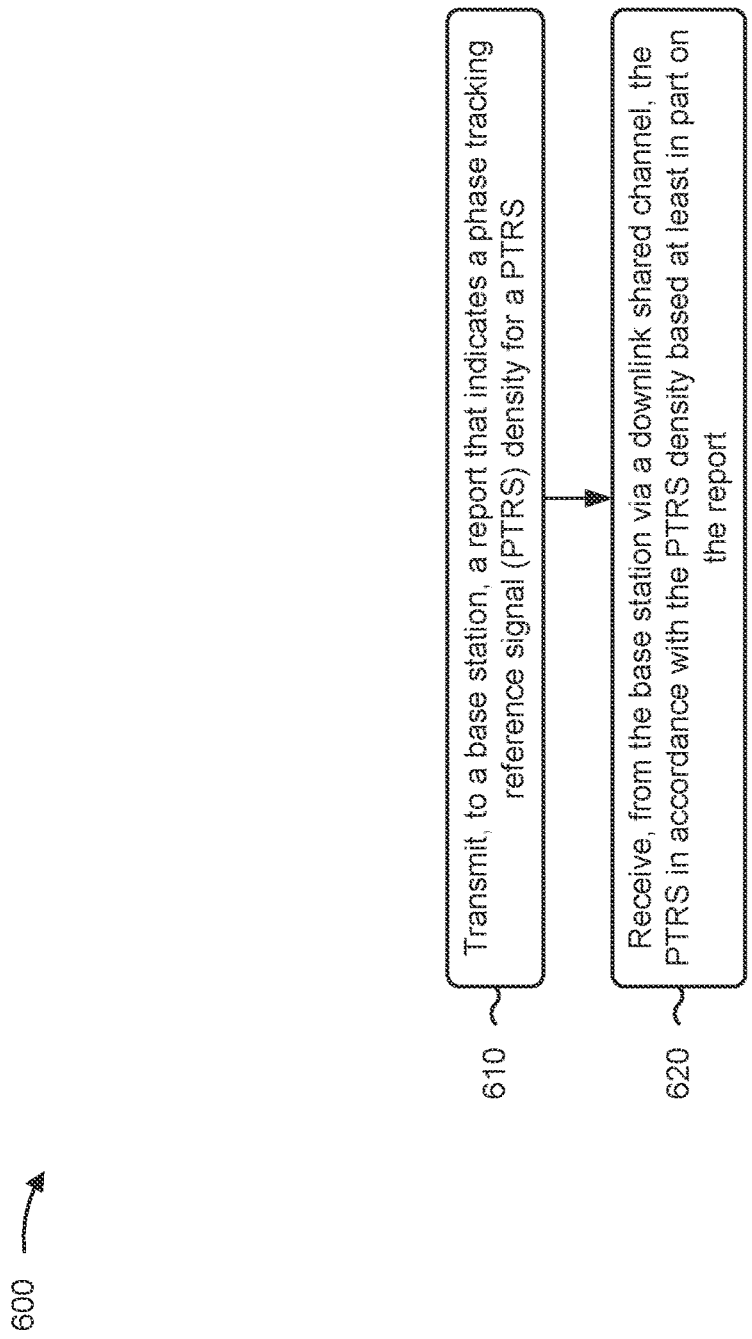
FIGS. 6-7 are diagrams illustrating example processes associated with determining a PTRS density, in accordance with various aspects of the present disclosure.

FIG. 6 is a diagram illustrating an example process 600 performed, for example, by a user equipment (UE), in accordance with various aspects of the present disclosure. Example process 600 is an example where the UE (e.g., UE 120) performs operations associated with determining a PTRS density.

As shown in FIG. 6, in some aspects, process 600 may include transmitting, to a base station, a report that indicates a PTRS density for a PTRS (block 610). For example, the UE (e.g., using antenna 252, transmit processor 264, TX MIMO processor 266, modulator 254, controller/processor 280, and/or memory 282) may transmit, to a base station, a report that indicates a PTRS density for a PTRS, as described above with respect to reference number 412.

As further shown in FIG. 6, in some aspects, process 600 may include receiving, from the base station via a downlink shared channel, the PTRS in accordance with the PTRS density based at least in part on the report (block 620). For example, the UE (e.g., using antenna 252, demodulator 254, MIMO detector 256, receive processor 258, controller/processor 280, and/or memory 282) may receive, from the base station via a downlink shared channel, the PTRS in accordance with the PTRS density based at least in part on the report, as described above with respect to reference number 414.

Process 600 may include additional aspects, such as any single aspect or any combination of aspects described below and/or in connection with one or more other processes described elsewhere herein. The one or more other processes described elsewhere herein may differ from process 600.

In a first aspect, the PTRS density is based at least in part on one or more of an MCS, an SNR, or a measured phase noise level associated with the UE.

In a second aspect, alone or in combination with the first aspect, process 600 includes receiving, from the base station, a CSI-RS, transmitting, to the base station, a CSI report that includes CSI associated with the UE based at least in part on the CSI-RS, and determining the SNR based at least in part on the CSI associated with the UE.

In a third aspect, alone or in combination with one or more of the first and second aspects, process 600 includes determining the MCS based at least in part on downlink information received from the base station via a downlink control channel.

In a fourth aspect, alone or in combination with one or more of the first through third aspects, process 600 includes receiving, from the base station, an initial PTRS earlier in time as compared to the PTRS, and determining the measured phase noise level based at least in part on the initial PTRS received from the base station.

In a fifth aspect, alone or in combination with one or more of the first through fourth aspects, process 600 includes receiving, from the base station, an instruction to use an increased MCS, and receiving, from the base station, the PTRS with an increased PTRS density based at least in part on the increased MCS.

In a sixth aspect, alone or in combination with one or more of the first through fifth aspects, process 600 includes receiving, from the base station, an instruction to use a reduced MCS, and receiving, from the base station, the PTRS with a reduced PTRS density based at least in part on the reduced MCS.

In a seventh aspect, alone or in combination with one or more of the first through sixth aspects, process 600 includes estimating a phase noise associated with the PTRS based at least in part on the PTRS density.

In an eighth aspect, alone or in combination with one or more of the first through seventh aspects, the PTRS density is associated with a time domain.

In a ninth aspect, alone or in combination with one or more of the first through eighth aspects, the report indicates the PTRS density with a granularity equal to 0, 5, 10, 20, 30, 40, 50, or 100 symbols.

In a tenth aspect, alone or in combination with one or more of the first through ninth aspects, process 600 includes transmitting, to the base station, an updated report that indicates an updated density for a subsequent PTRS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel. The one or more other processes described elsewhere herein may differ from process 600.

Figure 7:
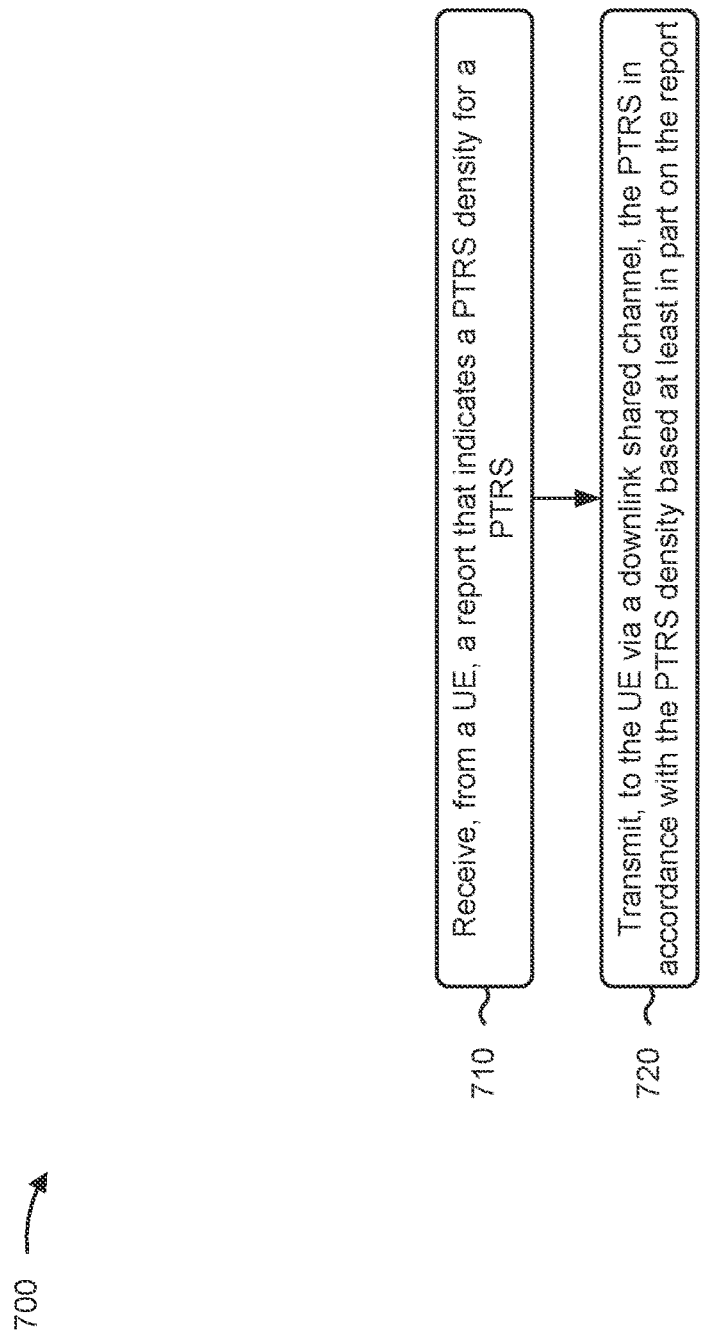

FIG. 7 is a diagram illustrating an example process 700 performed, for example, by a base station, in accordance with various aspects of the present disclosure. Example process 700 is an example where the base station (e.g., base station 110) performs operations associated with determining a PTRS density.

As shown in FIG. 7, in some aspects, process 700 may include receiving, from a UE, a report that indicates a PTRS density for a PTRS (block 710). For example, the base station (e.g., using antenna 234, demodulator 232, MIMO detector 236, receive processor 238, controller/processor 240, and/or memory 242) may receive, from a UE, a report that indicates a PTRS density for a PTRS, as described above with respect to reference number 412.

As further shown in FIG. 7, in some aspects, process 700 may include transmitting, to the UE via a downlink shared channel, the PTRS in accordance with the PTRS density based at least in part on the report (block 720). For example, the base station (e.g., using transmit processor 220, TX MIMO processor 230, modulator 232, antenna 234, controller/processor 240, memory 242, and/or scheduler 246) may transmit, to the UE via a downlink shared channel, the PTRS in accordance with the PTRS density based at least in part on the report, as described above with respect to reference number 414.

Process 700 may include additional aspects, such as any single aspect or any combination of aspects described below and/or in connection with one or more other processes described elsewhere herein. The one or more other processes described elsewhere herein may differ from process 700.

In a first aspect, the PTRS density is based at least in part on one or more of an MCS, an SNR, or a measured phase noise level associated with the UE.

In a second aspect, alone or in combination with the first aspect, process 700 includes transmitting, to the UE, an instruction to use an increased MCS, and transmitting, to the UE, the PTRS with an increased PTRS density based at least in part on the increased MCS.

In a third aspect, alone or in combination with one or more of the first and second aspects, process 700 includes transmitting, to the UE, an instruction to use a reduced MCS, and transmitting, to the UE, the PTRS with a reduced PTRS density based at least in part on the reduced MCS.

In a fourth aspect, alone or in combination with one or more of the first through third aspects, process 700 includes transmitting, to the UE, an initial PTRS earlier in time as compared to the PTRS, wherein the measured phase noise level is associated with the initial PTRS.

In a fifth aspect, alone or in combination with one or more of the first through fourth aspects, the PTRS density is associated with a time domain, and the report indicates the PTRS density with a granularity equal to 0, 5, 10, 20, 30, 40, 50, or 100 symbols.

In a sixth aspect, alone or in combination with one or more of the first through fifth aspects, process 700 includes receiving, from the UE, an updated report that indicates an updated PTRS density for a subsequent PTRS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel. Additionally, one or more other processes described elsewhere herein may differ from process 700.

Figure 8:
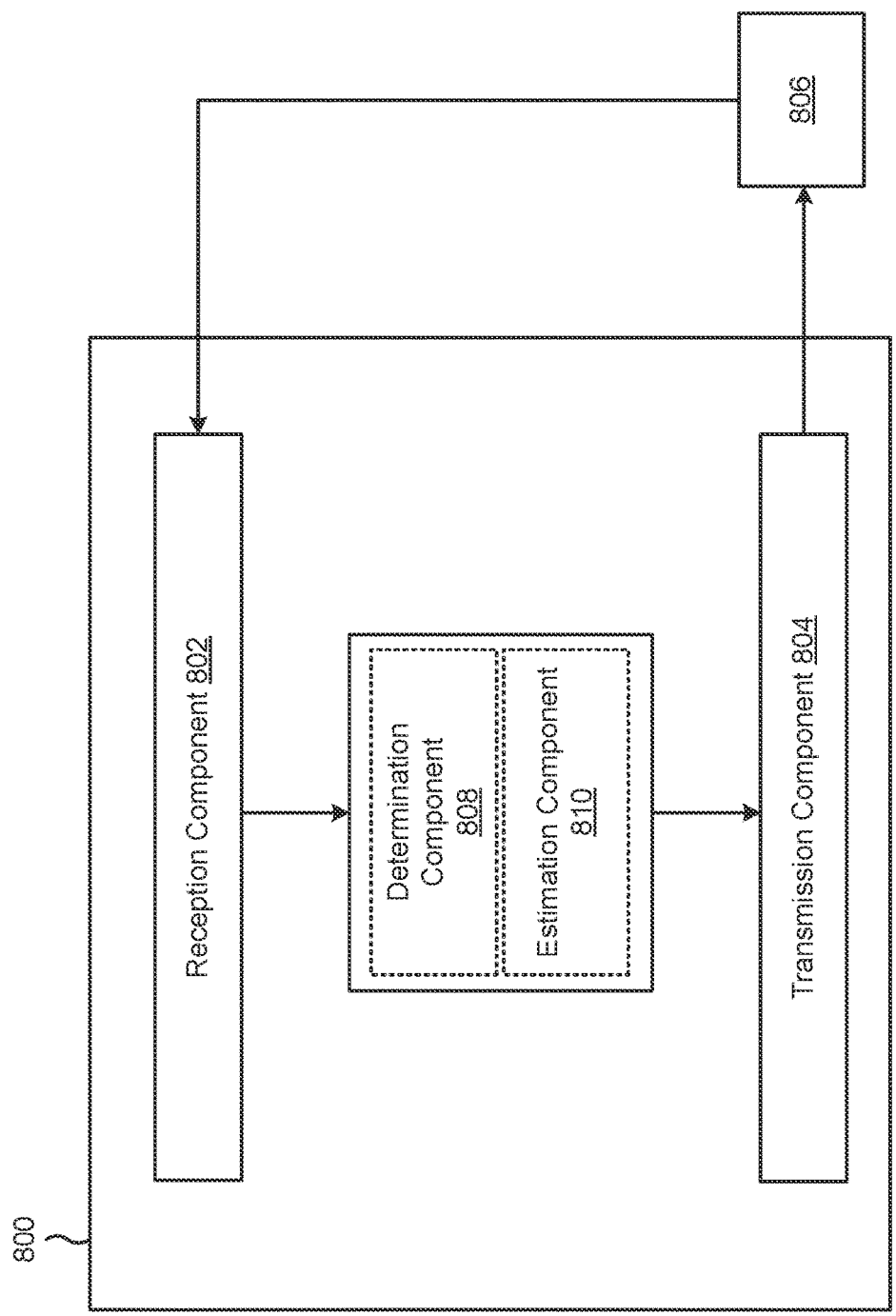
FIGS. 8-9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808, or an estimation component 810, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit, to a base station, a report that indicates a PTRS density for a PTRS. The reception component 802 may receive, from the base station via a downlink shared channel, the PTRS in accordance with the PTRS density based at least in part on the report.

The reception component 802 may receive, from the base station, a CSI-RS. The transmission component 804 may transmit, to the base station, a CSI report that includes CSI associated with the UE based at least in part on the CSI-RS. The determination component 808 may determine the SNR based at least in part on the CSI associated with the UE. The determination component 808 may determine the MCS based at least in part on downlink information received from the base station via a downlink control channel.

The reception component 802 may receive, from the base station, an initial PTRS earlier in time as compared to the PTRS. The determination component 808 may determine the measured phase noise level based at least in part on the initial PTRS received from the base station.

The reception component 802 may receive, from the base station, an instruction to use an increased MCS. The reception component 802 may receive, from the base station, the PTRS with an increased PTRS density based at least in part on the increased MCS.

The reception component 802 may receive, from the base station, an instruction to use a reduced MCS. The reception component 802 may receive, from the base station, the PTRS with a reduced PTRS density based at least in part on the reduced MCS.

The estimation component 810 may estimate a phase noise associated with the PTRS based at least in part on the PTRS density. The transmission component 804 may transmit, to the base station, an updated report that indicates an updated density for a subsequent PTRS.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
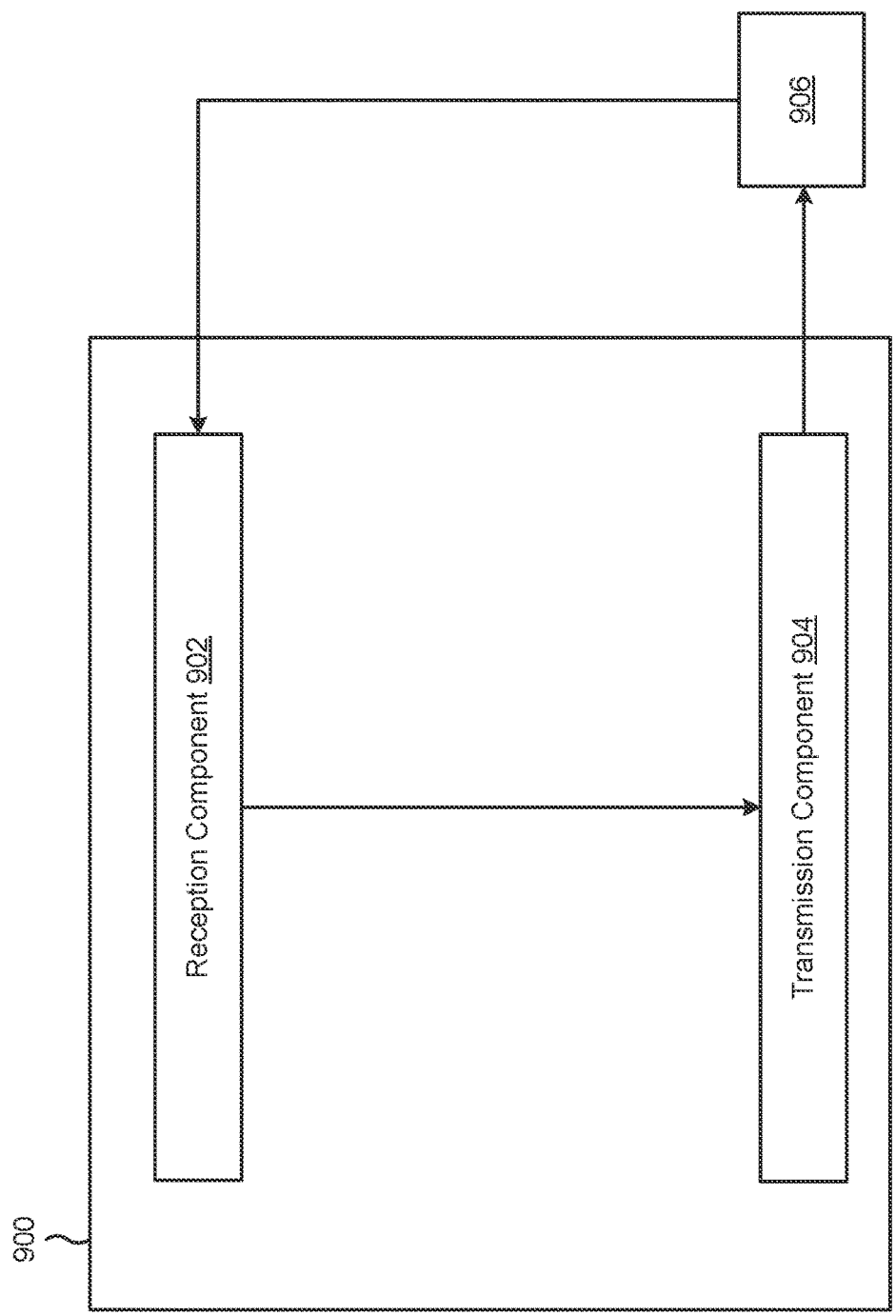

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a UE, a report that indicates a PTRS density for a PTRS. The transmission component 904 may transmit, to the UE via a downlink shared channel, the PTRS in accordance with the PTRS density based at least in part on the report.

The transmission component 904 may transmit, to the UE, an instruction to use an increased MCS. The transmission component 904 may transmit, to the UE, the PTRS with an increased PTRS density based at least in part on the increased MCS.

The transmission component 904 may transmit, to the UE, an instruction to use a reduced MCS. The transmission component 904 may transmit, to the UE, the PTRS with a reduced PTRS density based at least in part on the reduced MCS.

The transmission component 904 may transmit, to the UE, an initial PTRS earlier in time as compared to the PTRS, wherein the measured phase noise level is associated with the initial PTRS. The reception component 902 may receive, from the UE, an updated report that indicates an updated PTRS density for a subsequent PTRS.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting, to a network entity, a report that indicates a phase tracking reference signal (PTRS) density in a time domain for a PTRS,
        wherein the report indicates the PTRS density with a granularity equal to a number of symbols selected from a group consisting of: 0 symbols, 5 symbols, 10 symbols, 20 symbols, 30 symbols, 40 symbols, 50 symbols, and 100 symbols; and
    receiving, from the network entity via a downlink shared channel, the PTRS in accordance with the PTRS density based at least in part on the report,
        wherein, depending on the PTRS density, the PTRS is received every 0 symbols, every 5 symbols, every 10 symbols, every 20 symbols, every 30 symbols, every 40 symbols, every 50 symbols, or every 100 symbols, and
        wherein receiving every 0 symbols indicates no PTRS.

2. The method of claim 1, wherein the PTRS density is based at least in part on one or more of: a modulation and coding scheme (MCS), a signal-to-noise ratio (SNR), or a measured phase noise level associated with the UE.

3. The method of claim 2, further comprising:
    receiving, from the network entity, a channel state information (CSI) reference signal (CSI-RS);
    transmitting, to the network entity, a CSI report that includes CSI associated with the UE based at least in part on the CSI-RS; and
    determining the SNR based at least in part on the CSI associated with the UE.

4. The method of claim 2, further comprising:
    determining the MCS based at least in part on downlink information received from the network entity via a downlink control channel.

5. The method of claim 2, further comprising:
    receiving, from the network entity, an initial PTRS earlier in time as compared to the PTRS; and
    determining the measured phase noise level based at least in part on the initial PTRS received from the network entity.

6. The method of claim 2, further comprising:
    receiving, from the network entity, an instruction to use an increased MCS; and
    receiving, from the network entity, the PTRS with an increased PTRS density based at least in part on the increased MCS.

7. The method of claim 2, further comprising:
    receiving, from the network entity, an instruction to use a reduced MCS; and
    receiving, from the network entity, the PTRS with a reduced PTRS density based at least in part on the reduced MCS.

8. The method of claim 1, further comprising:
    estimating a phase noise associated with the PTRS based at least in part on the PTRS density.

9. The method of claim 1, further comprising:
transmitting, to the network entity, an updated report that indicates an updated density for a subsequent PTRS.

10. A method of wireless communication performed by a network entity, comprising:
receiving, from a user equipment (UE), a report that indicates a phase tracking reference signal (PTRS) density in a time domain for a PTRS,
wherein the report indicates the PTRS density with a granularity equal to a number of symbols selected from a group consisting of: 0 symbols, 5 symbols, 10 symbols, 20 symbols, 30 symbols, 40 symbols, 50 symbols, and 100 symbols; and
transmitting, to the UE via a downlink shared channel, the PTRS in accordance with the PTRS density based at least in part on the report,
wherein, depending on the PTRS density, the PTRS is transmitted every 0 symbols, every 5 symbols, every 10 symbols, every 20 symbols, every 30 symbols, every 40 symbols, every 50 symbols, or every 100 symbols, and
wherein receiving every 0 symbols indicates no PTRS.

11. The method of claim 10, wherein the PTRS density is based at least in part on one or more of: a modulation and coding scheme (MCS), a signal-to-noise ratio (SNR), or a measured phase noise level associated with the UE.

12. The method of claim 11, further comprising:
transmitting, to the UE, an instruction to use an increased MCS; and
transmitting, to the UE, the PTRS with an increased PTRS density based at least in part on the increased MCS.

13. The method of claim 11, further comprising:
transmitting, to the UE, an instruction to use a reduced MCS; and
transmitting, to the UE, the PTRS with a reduced PTRS density based at least in part on the reduced MCS.

14. The method of claim 11, further comprising:
transmitting, to the UE, an initial PTRS earlier in time as compared to the PTRS, wherein the measured phase noise level is associated with the initial PTRS.

15. The method of claim 10, further comprising:
receiving, from the UE, an updated report that indicates an updated PTRS density for a subsequent PTRS.

16. A user equipment (UE) for wireless communication, comprising:
a memory; and
one or more processors coupled to the memory, the one or more processors configured to:
transmit, to a network entity, a report that indicates a phase tracking reference signal (PTRS) density in a time domain for a PTRS,
wherein the report indicates the PTRS density with a granularity equal to a number of symbols selected from a group consisting of: 0 symbols, 5 symbols, 10 symbols, 20 symbols, 30 symbols, 40 symbols, 50 symbols, and 100 symbols; and
receive, from the network entity via a downlink shared channel, the PTRS in accordance with the PTRS density based at least in part on the report,
wherein, depending on the PTRS density, the PTRS is received every 0 symbols, every 5 symbols, every 10 symbols, every 20 symbols, every 30 symbols, every 40 symbols, every 50 symbols, or every 100 symbols, and
wherein receiving every 0 symbols indicates no PTRS.

17. The UE of claim 16, wherein the PTRS density is based at least in part on one or more of: a modulation and coding scheme (MCS), a signal-to-noise ratio (SNR), or a measured phase noise level associated with the UE.

18. The UE of claim 17, wherein the one or more processors are further configured to:
receive, from the network entity, a channel state information (CSI) reference signal (CSI-RS);
transmit, to the network entity, a CSI report that includes CSI associated with the UE based at least in part on the CSI-RS; and
determine the SNR based at least in part on the CSI associated with the UE.

19. The UE of claim 17, wherein the one or more processors are further configured to:
determine the MCS based at least in part on downlink information received from the network entity via a downlink control channel.

20. The UE of claim 17, wherein the one or more processors are further configured to:
receive, from the network entity, an initial PTRS earlier in time as compared to the PTRS; and
determine the measured phase noise level based at least in part on the initial PTRS received from the network entity.

21. The UE of claim 16, wherein the one or more processors are further configured to:
transmit, to the network entity, an updated report that indicates an updated density for a subsequent PTRS.

22. A network entity for wireless communication, comprising:
a memory; and
one or more processors coupled to the memory, the one or more processors configured to:
receive, from a user equipment (UE), a report that indicates a phase tracking reference signal (PTRS) density in a time domain for a PTRS,
wherein the report indicates the PTRS density with a granularity equal to a number of symbols selected from a group consisting of: 0 symbols, 5 symbols, 10 symbols, 20 symbols, 30 symbols, 40 symbols, 50 symbols, and 100 symbols; and
transmit, to the UE via a downlink shared channel, the PTRS in accordance with the PTRS density based at least in part on the report,
wherein, depending on the PTRS density, the PTRS is transmitted every 0 symbols, every 5 symbols, every 10 symbols, every 20 symbols, every 30 symbols, every 40 symbols, every 50 symbols, or every 100 symbols, and
wherein receiving every 0 symbols indicates no PTRS.

23. The network entity of claim 22, wherein the PTRS density is based at least in part on one or more of: a modulation and coding scheme (MCS), a signal-to-noise ratio (SNR), or a measured phase noise level associated with the UE.

24. The network entity of claim 23, wherein the one or more processors are further configured to:
transmit, to the UE, an initial PTRS earlier in time as compared to the PTRS, wherein the measured phase noise level is associated with the initial PTRS.

25. The network entity of claim 22, wherein the one or more processors are further configured to:
receive, from the UE, an updated report that indicates an updated PTRS density for a subsequent PTRS.

26. The network entity of claim 23, wherein the one or more processors are further configured to:
   transmit, to the UE, an instruction to use an increased MCS; and
   transmit, to the UE, the PTRS with an increased PTRS density based at least in part on the increased MCS.

27. The network entity of claim 23, wherein the one or more processors are further configured to:
   transmit, to the UE, an instruction to use a reduced MCS; and
   transmit, to the UE, the PTRS with a reduced PTRS density based at least in part on the reduced MCS.

28. The UE of claim 17, wherein the one or more processors are further configured to:
   receive, from the network entity, an instruction to use an increased MCS; and
   receive, from the network entity, the PTRS with an increased PTRS density based at least in part on the increased MCS.

29. The UE of claim 17, wherein the one or more processors are further configured to:
   receive, from the network entity, an instruction to use a reduced MCS; and
   receive, from the network entity, the PTRS with a reduced PTRS density based at least in part on the reduced MCS.

30. The UE of claim 17, wherein the one or more processors are further configured to:
   estimate a phase noise associated with the PTRS based at least in part on the PTRS density.

\* \* \* \* \*